United States Patent [19]
Suzuki et al.

[11] Patent Number: 5,979,580
[45] Date of Patent: Nov. 9, 1999

[54] HIGH GROUND-CLEARANCE HYBRID TRACK/WHEEL DRIVE

[75] Inventors: Hidenao Suzuki; Ryohei Matsumoto, both of Kanagawa-ken, Japan

[73] Assignee: Suzuki, Motor Corporation, Japan

[21] Appl. No.: 08/907,409

[22] Filed: Aug. 7, 1997

[51] Int. Cl.$^6$ .................................................. B62D 51/06
[52] U.S. Cl. .......................... 180/8.7; 180/9.5; 180/9.52; 180/9.64
[58] Field of Search ................................. 180/8.7, 9, 9.1, 180/9.5, 9.52, 9.62, 9.64, 9.32, 9.46, 7.1, 8.3, 8.2; 280/5.2, 5.26, 5.22, 28.5; 305/120, 129, 130, 132, 134, 136, 138

[56] References Cited

U.S. PATENT DOCUMENTS 4,061,199  12/1977  Last ......................................... 180/8 A

FOREIGN PATENT DOCUMENTS 4146875  5/1992  Japan .
4244489  9/1992  Japan .

*Primary Examiner*—Robert J. Oberleitner
*Assistant Examiner*—C. T. Bartz
*Attorney, Agent, or Firm*—Morrison Law Firm

[57] ABSTRACT

A rough-terrain vehicle employs separate track drives located on opposite sides of a vehicle body, like the wheels of a car. The tractor drives can revolve the track to permit track-driven travel. The drives can also halt the tracks relative to the drives and rotated the entire track drive that supports the track in which case the track drive rotates like a wheel. The latter mode provides an ability to traverse very rough surfaces. To provide high ground clearance, the support connecting the track drive to the vehicle body is located above the axis of rotation of the track drive. Almost the entire transmission mechanism for the track drive is confined to a volume enclosed by the loop of the track protecting it. The track drive supports the track on a polar array of wheels, each located along the line that divides the track into two loops.

5 Claims, 7 Drawing Sheets

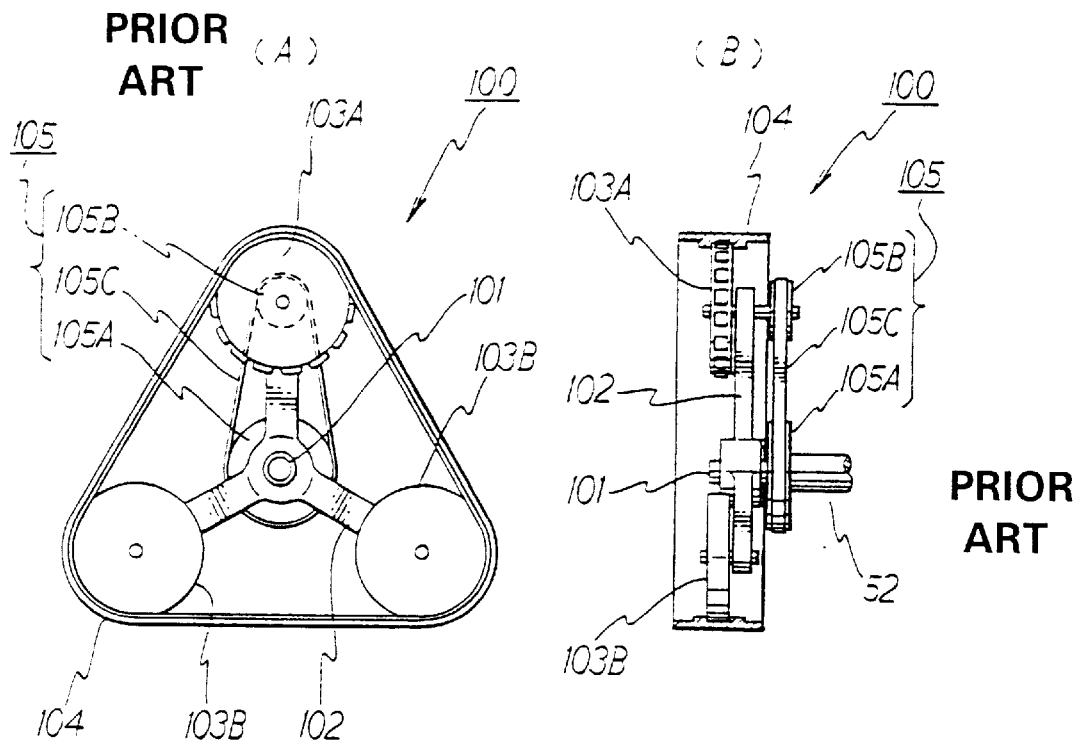
Fig. 7(A) PRIOR ART
Fig. 7(B) PRIOR ART
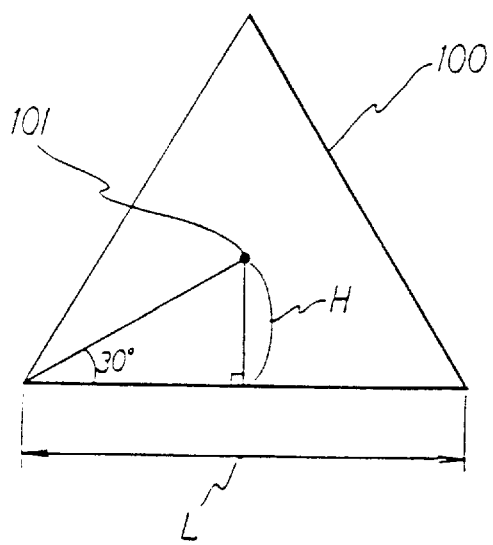
Fig. 8 PRIOR ART

HIGH GROUND-CLEARANCE HYBRID TRACK/WHEEL DRIVE

BACKGROUND OF THE INVENTION

The present invention relates to a moving vehicle. More particularly, the invention relates to a moving vehicle equipped with a track device.

Referring to FIG. 6, a moving vehicle 50 of the prior art has the ability to travel on a jagged and extremely uneven road surface. Moving vehicle 50 has a vehicle body 51 with a plurality of track drive device 100 which function in place of wheels on an ordinary vehicle. A drive to provide motive force to the track drive devices is provided but not shown in the drawing. The drive means has a drive shaft for each track drive mechanism 100. A drive source provides the drive shaft with torque. Each track drive mechanism 100 is placed at the end of drive shaft 52.

Referring to FIG. 7, in the track drive mechanism 100 of the prior art, an input axis 101 transfers torque from drive shaft 52 of the drive means to a rotating wheel 103A A power transfer means 105 transfers the rotation of input axis 101 to rotating wheel 103A. A support member 102 supports input axis 101, which rotates freely at the center by way of a bearing. Three rotating wheels 103A, 103B, and 103B are located at equal distances from the center of input axis 101 about which they can rotate. An endless, track 104 wraps around rotating wheels 103A, B, and C.

Rotating wheels 103A, 103B, 103B are positioned at equal distances from the center by support member 102. Referring to FIG. 7(A), track 104 is wrapped in an approximate equilateral triangle around rotating wheels 103A, 103B, 103B. Rotating wheel 103A is a chain sprocket wheel used to drive the track. The torque transmitted to rotating wheel 103A is transmitted to other wheels 103B and 103C via track 104.

Power transfer means 105 is equipped with a main driving sprocket wheel 105A which is anchored to input axis 101. A coupled driving sprocket wheel 105B, has the same axis as, and is linked to, rotating wheel 103A. An endless circular belt 105C links sprocket wheels 105A and 105B.

Moving vehicle 50 uses track drive mechanism 100 of the prior art as a wheel. Under normal conditions, torque is transferred from input axis 101 to rotating wheel 103A by way of power transfer means 105. Rotating wheels 103A, 103B, 103B forms an approximate equilateral triangle, and track 104 drives along the boundary edge of the triangle. Travel occurs without the rotation of support member 102.

If travel by track 104 is hindered by a jagged or partly blocked or uneven road surface, wheel 103A is halted. Torque transmitted to input axis 101 drives the entire support member 102 to rotate about axis 101. That is, all of track drive mechanism 100 rotates as a single wheel. Bumps of a size that can be tolerated by the equilateral triangle track mechanism defined by three the rotating wheels 103A, 103B, and 103B can be traveled over.

In this example of the prior art, input axis 101 of track drive mechanism 100 is connected to the same axis as drive shaft 52 which projects from the side of vehicle body 51. As a result, vehicle body 51 can only be maintained at approximately the same height as the distance between input axis 101 of track drive mechanism 100 and the road surface.

There is a height H between the base of vehicle body 51 and the road surface. Referring to FIG. 8, if track drive mechanism 100 is an approximate equilateral triangle with a side of length L, then $H=(L/2)\cdot\tan(30°)$. Height H is approximately 0.2887 times L. Compared to the overall size of track drive mechanism 100, vehicle body 51 does not have great clearance height. As a result, referring to FIG. 9, collisions between obstacles and vehicle body 51 may occur easily between the pair of track drive mechanisms 100 acting as front wheels. In this situation, travel is either impossible or causes damage to vehicle body 51.

Referring to FIG. 7(B), in track drive mechanism 100 of the prior art, power transfer means 105 juts out of the area protected by track 104. Referring to FIG. 10, this results in collisions with obstacles becoming more likely, particularly when coupled driving sprocket 105B moves lower as support member 102 rotates. Concerns about damage and breakdown will result.

OBJECTS AND SUMMARY OF THE INVENTION

An object of the present invention is to overcome the problems of the prior art and to provide a moving vehicle which can pass through jagged roads without damage to the drive train or vehicle.

Briefly, a rough-terrain vehicle employs separate track drives located on opposite sides of a vehicle body, like the wheels of a car. The tractor drives can revolve the track to permit track-driven travel. The drives can also halt the tracks relative to the drives and rotated the entire track drive that supports the track in which case the track drive rotates like a wheel. The latter mode provides an ability to traverse very rough surfaces. To provide high ground clearance, the support connecting the track drive to the vehicle body is located above the axis of rotation of the track drive. Almost the entire transmission mechanism for the track drive is confined to a volume enclosed by the loop of the track protecting it. The track drive supports the track on a polar array of wheels, each located along the line that divides the track into two loops.

According to an embodiment of the invention described in claim 1, there is provided a moving vehicle, comprising a vehicle body; a plurality of track drive mechanisms equipped on vehicle body which function as wheels; a drive means which provides the rotational movement for the track drive mechanisms.

According to an embodiment of the present invention, there is provided, a vehicle, comprising: a vehicle chassis, a track subchassis connected to the vehicle chassis and rotatable about an axis of rotation, the track subchassis including a track revolvably supported thereon in a position that allows the vehicle to be supported on a surface by the track, the track subchassis being selectively fixable with respect to the vehicle chassis and selectively freed to rotate with respect to the vehicle chassis, a transmission drivingly coupling a prime mover connected to the vehicle chassis and the track, such that the track is drivable by the prime mover, the transmission including a drive shaft having a shaft axis located a substantial distance from the axis of rotation in a direction away from the surface.

According to another embodiment of the present invention, there is provided, a vehicle, comprising: a vehicle chassis, a track chassis connected to the vehicle chassis, a track subchassis rotatably connected to the track chassis and having an axis of rotation, the track subchassis including a track revolvably supported thereon in a position that allows the vehicle to be supported on a surface by the track, a drive support connecting the track chassis and the vehicle chassis, the axis of rotation being located between the surface and the drive support when the vehicle is oriented to be supported on the surface by the track.

According to still another embodiment of the present invention, there is provided, a vehicle, comprising: a main vehicle body, a plurality of track drives, each having a track arranged to allow the vehicle body to be supported, above a surface, by the tracks, each of the tracks being revolvable about the each of the plurality of track drives, and each of the plurality of track drives being rotatable about a respective center of rotation, whereby the vehicle body can move about on the surface either by movement of the tracks or by rotation of the track drives, a motor drive drivingly connected to power rotation of at least one of the track drives, an input shaft driven by a drive shaft of the motor drive, a first power transfer drive which transfers the rotations from the input shaft to at least one of the rotating wheels, a second power transfer drive which transfers torque in each of the track drives from the drive shaft to the input shaft, a holding guide anchored at one end to the vehicle body and at the other end to the track drive, the input axis being supported by the holding guide between the drive shaft and the input shaft.

According to still another embodiment of the present invention, there is provided, a vehicle, comprising: a vehicle chassis, at least two wheel elements on the vehicle chassis rotatable about an axis, each of the at least two wheel elements having a track revolvable with respect to the each of the at least two wheel elements, each of the at least two wheel elements including a portion affixed to the vehicle chassis, running vertically at least to the axis, and rotatably connected to the each of the at least two wheel elements, such that the vehicle chassis is supportable on a surface by the tracks of the each of the at least two wheel elements, the axis lying between the surface and the a point where the portion is affixed to the vehicle chassis.

There are track drive mechanisms, comprising an input axis which is driven by a drive shaft of the drive means; a support member which supports the center of the input axis in a freely rotating manner; a plurality of rotating wheels which are placed radially from the center of the support member and which are freely rotating; an endless circular track which wraps around the rotating wheels; a first power transfer means which transfers the rotation of the input axis to at least one of the rotating wheels; a second power transfer means which transfers torque from the drive shaft to the input axis of these track drive devices; a holding guide which maintains the drive shaft and input axis at a specified distance and in a freely rotating manner.

One end of the holding guide is anchored to the vehicle body, and the drive shaft is placed above the input axis by the holding guide.

When traveling with the above configuration, torque is provided from the drive shaft to the input axis by way of the second power transfer means. When traveling on a road that is not very jagged or uneven, rotation movement is provided from the input axis to the specified rotation wheel by way of a first power transfer means. The track is driven along the outer surface of each rotating wheel without the rotation of the support member. Movement occurs in the area between the two adjacent rotating wheels along the ground-plane.

When traveling on an uneven surface, the support member rotates with the input axis as the center. The entire track drive mechanism functions as a wheel, causing the vehicle to travel.

According to another embodiment of the present invention described in claim 2, there is provided a moving vehicle with the same configuration as the invention in claim 1. In addition, all of the structure of the track drive mechanism except for the vehicle body anchoring end is placed within the interior breadth of the track.

With this configuration, travel occurs in almost the same manner as in the invention described in claim 1. In addition, travel can occur without almost any of the structure of the track drive mechanism jutting outside from the interior area of the track.

According to still another embodiment of the present invention described in claim 3, there is provided a moving vehicle with the same configuration as the invention in claim 2. In addition, it has a structure where the support member is placed along the input axis between first power transfer means and second power transfer means.

With this configuration, travel occurs in almost the same manner as in the invention described in claim 1. In addition, each of the rotating wheels, supported by the support member which is placed between each of the power transfer means, abuts against the track in approximately the center of the width of the track. The driving of the track takes place under these conditions.

The present invention tries to achieve the above objects with the above configurations.

The above, and other objects, features, and advantages of the present invention will become apparent from the following description read in conjunction with the accompanying drawings in which like reference numerals designate the same elements.

BRIEF DESCRIPTION OF THE DRAWINGS

FIG. 7 shows the track drive mechanism of the prior art disclosed in FIG. 6. FIG. 7(A) is a front view. FIG. 7(B) is a side view with a portion removed.

FIG. 8 is a schematic drawing of the track drive mechanism of the prior art and is an explanatory drawing which explains the height of the input axis from the road surface.

DETAILED DESCRIPTION OF THE PREFERRED EMBODIMENTS

Referring to FIGS. 1–5, an embodiment of the present invention is a moving vehicle 10, comprising a vehicle main body 11, four track drive mechanisms 20 which are used as wheels on vehicle main body 11, a drive means which provides the rotational movement of track drive mechanism 20.

Figure 1:
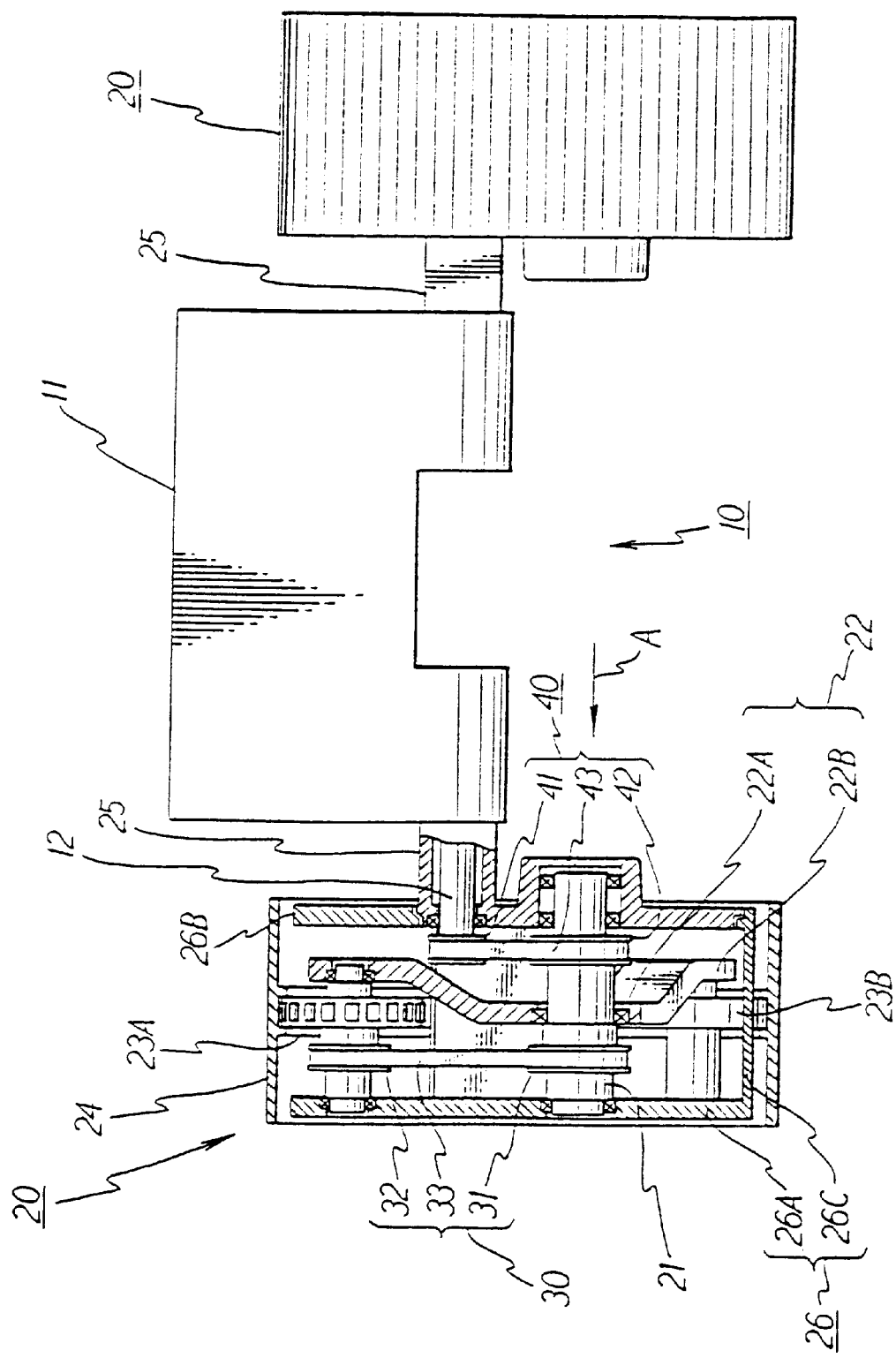
FIG. 1 is a front view of the present embodiment with a portion removed.

Referring to FIG. 1, moving vehicle 10 has a track 20 drive, one of two which function as front wheels of a vehicle. Track 20 is supported with respect to vehicle body 11 by holding guide 25 on both the right and left sides of vehicle body 11. Rear wheels are similarly made from a pair of track drive mechanisms 20, but are not shown in the drawing. In the interior of each of the holding guides 25, there is a freely rotating drive shaft 12 which provides torque by a drive source (not shown) of a drive means placed inside vehicle body 11. In other words, there is a drive shaft 12 for each track drive mechanism 20. Each track drive mechanism 20 is drivingly connected with the end of drive shaft 12.

Track drive mechanism 20 has an input shaft 21 driven by drive shaft 12. A support member 22 supports a freely rotating input shaft 21 at its center 22A. Three rotating wheels 23A, 23B, and 23B rotate freely at equal distances from center 22A of support member 22. An endless circular track 24 wraps around rotating wheels 23A, 23B, and 23B. A first power transfer means 30 transfers drive torque from input shaft 21 to rotating wheel 23A.

Track drive mechanism 20 has a second power transfer mechanism 40 which transfers torque from drive shaft 12 to input shaft 21. A holding guide 25 maintains drive shaft 12 and input shaft 21 at a specified distance and permits each to rotate freely. A frame body 26 is located inside track 24 to support the above elements.

Figure 2:
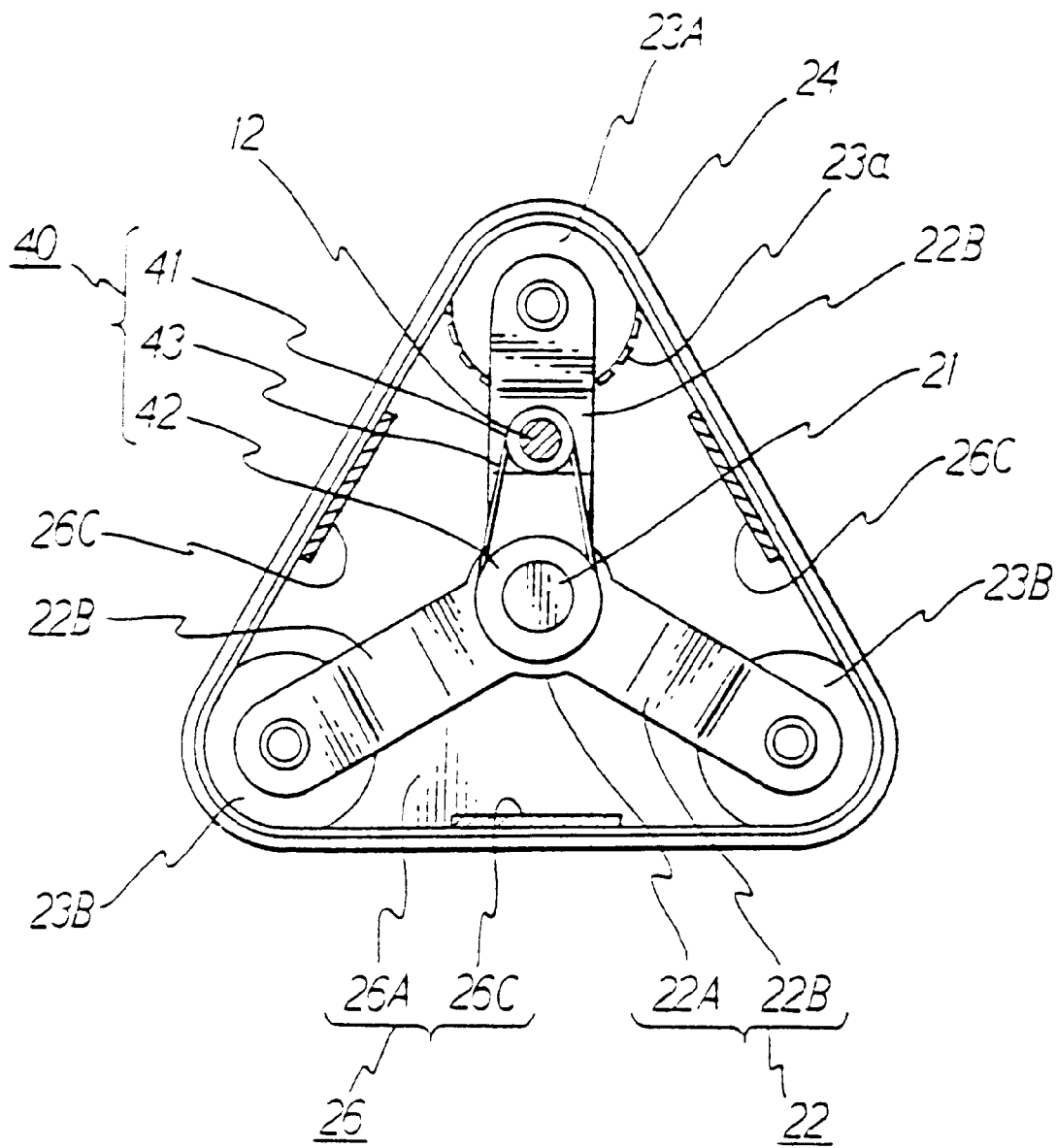
FIG. 2 is a side view from the direction of arrow A (of Fig. 1) showing a holding guide 25 and frame body 26 with a portion missing.

Referring to FIG. 2, three rotating wheels 23A, 23B, and 23B are located at equal distances from a center defined by input shaft 21. Rotating wheels 23A, 23B, and 23C are spaced 120 degrees apart. Support member 22 support the three rotating wheels 23A, 23B, and 23B in a manner that permits free rotation of the wheels.

In other words, support member 22 is extended on three sides of center 22A. On each end there is an arm 22B which holds one of the wheels. The three arms 22B are bent so that center 22A of support member 22 and each of the rotating wheels 23A, 23B, and 23B are all in the same approximate longitudinal position along the axis of input shaft 21.

There is a bearing in center 22A of support member 22. Input axle 21 is supported so that it rotates freely.

Input shaft 21 is held by support member 22 near its axial center. Input shaft 21 is supported on one end by frame body 26 and on the other end by holding guide 25. Torque is transferred to input shaft 21 from drive shaft 12 via second power transfer means 40.

Second power transfer means 40 has a main driving pulley 41 which is anchored to the end of drive shaft 12. A coupled driving pulley 42 is anchored to input axis 12. A transfer belt 43 links pulley 41 and pulley 42. The transfer of torque occurs between the separating drive shaft 12 and input shaft 21.

A track 24 wraps once around rotating wheels 23A, 23B, and 23B located on each of the ends of support member 22. Track 24 is flexible and permits deformation. Track 24 is formed in a circle using rubber as raw material. Track 24 has sufficient tensile strength to abut the inner surface of track 24 against a portion of each of the outer perimeter of each of the rotating wheels 23A, 23B, and 23B with a uniform pressure. If one of the wheels 23A, 23B, and 23C is rotated, all of the rotating wheels are rotate since they are inter-linked by track 24.

Of the three rotating wheels 23A, 23B, and 23C described above, rotating wheel 23A is a sprocketed wheel to drive the track 24. The plurality of projections 23a on the outer perimeter interlock with a single row of holes in the drive direction. By the rotation of rotating wheel 23A, track 24 is driven in a specified direction.

Rotating wheel 23A is inked with, and shares a rotating axis with, coupled driving pulley 32. Main driving pulley 31 shares a common axis with input shaft 21. Drive torque is transferred from main driving pulley 31, through transfer belt 33, to coupled driving pulley 32. The latter forms a first power transfer means 30. Thus, first power transfer means provides the capability of transferring torque from input shaft 21 to wheel 23A.

Referring again to FIG. 1, support member 22 is located along input shaft 21 between first power transfer means 30 and second power transfer means 40. As a result, each of the wheels 23A, 23B, and 23B abuts track 24 at approximately the middle of the width of track 24.

Support member 22, first power transfer means 30, second power transfer means 40, and input shaft 21 are all located between two side plates 26A and 26B of frame body 26. Frame body 26 is made from two side plates 26A and 26B and three connecting portions 26C which connects them together. Connecting portions 26C are located within the width of track 24 with very little jutting out. All of the structure, except for the holding guide 25 of track drive mechanism 20, is confined to the space defined by side plates 26A and 26B and track 24 in the cross direction, with minimal protrusion.

Frame body 26 supports, by way of side plate 26A, one end of input shaft 21 permitting it to rotate freely. Similarly, one end of the rotating axis of each of the wheels 23A, 23B, and 23B is supported for free rotation. Frame body 26 and support member 22 rotate as a whole about input shaft 21.

Figure 3:
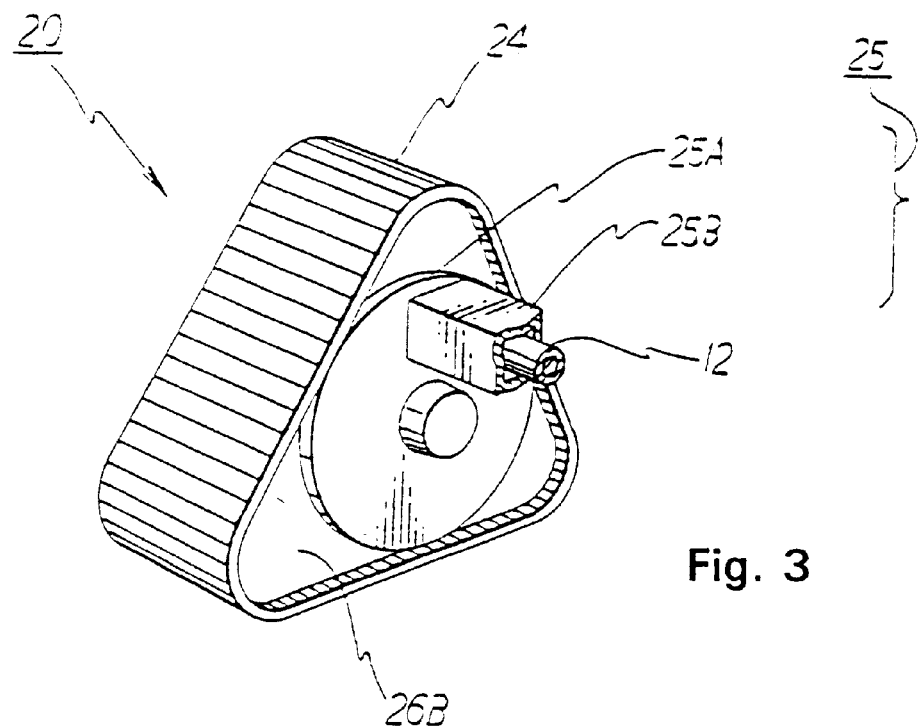
FIG. 3 is a perspective view of the track drive mechanism disclosed in FIG. 1.

Holding guide 25 is adjacent side plate 26B of frame body 26. Referring to FIG. 3, holding guide 25 is formed from circular plate 25A and from vehicle body anchoring end 25B. Circular plate 25A is in roughly the same plane as side plate 26B. Vehicle body side anchor area 25B is anchored to vehicle body 11.

Circular plate 25A maintains the other end of input shaft 21 at its center permitting free rotation. In addition, circular plate 25A is freely rotatable with respect to side plate 26B. As a result, the entire track drive mechanism 20 can rotate around circular plate 25A at the center.

Vehicle body side anchoring area 25B supports drive shaft 12 in its interior permitting drive shaft 12 to rotate freely. Holding guide 25 is affixed to vehicle body 11 in such a position that vehicle body anchoring end 25B is higher than circular plate 25A with respect to vehicle body 11. Drive shaft 12, which is held by vehicle body anchoring end 25B, can maintain a position that is higher than input shaft 21. Drive shaft 12 and input shaft 21 are maintained roughly parallel by holding guide 25.

Figures 4A, 4B:
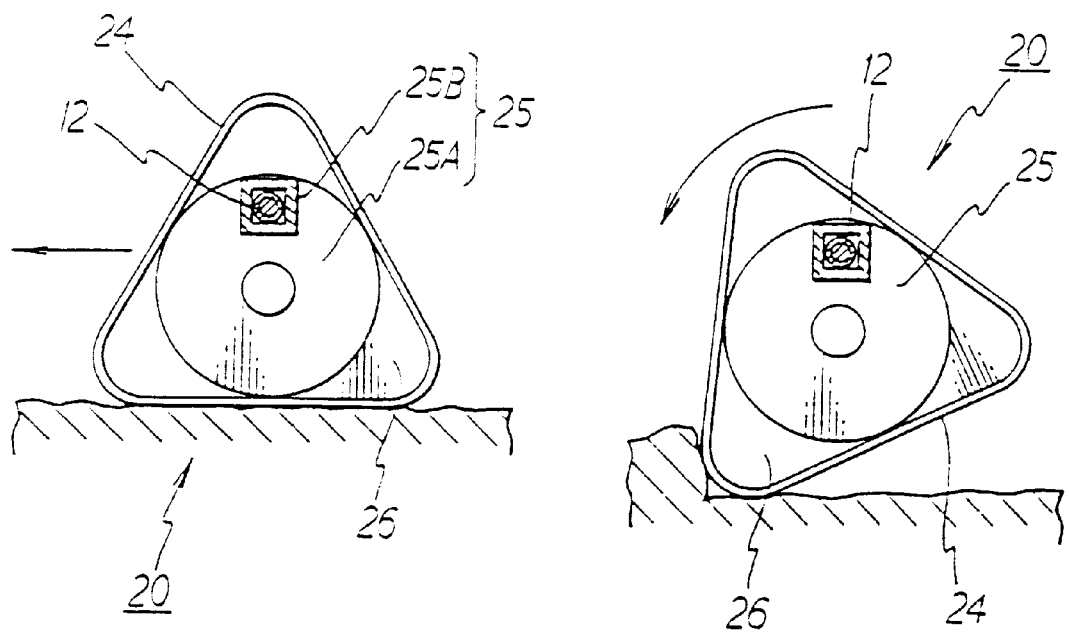
FIG. 4(A) is an explanatory Fig. showing the moving track drive mechanism on a road surface which is not very jagged or uneven.
FIG. 4(B) is an explanatory Fig. showing the moving track drive mechanism on a road surface which is jagged and uneven.

Referring to FIGS. 4(A) and 4(B), holding guide 25, during vehicle movement, remains stationary with respect to vehicle body 11. During movement along a relatively flat road surface, track drive mechanism 20 does not rotate frame body 26. Only track 24 is driven by interior rotating wheel 23A. Frame body 26 is stationary relative to holding guide 25.

Referring to FIG. 4(B), when moving through a jagged and uneven road surface, however, movement with just track 24 is hindered. Torque transferred to input shaft 21 is transferred to frame body 26 and support member 22, etc. The entire track drive mechanism rotates as a whole around input shaft 21.

Because vehicle body anchoring end 25B is anchored to vehicle body 11, holding guide 25 does not rotate. The entire track drive mechanism 20 with the exception of holding guide 25 rotates around circular plate 25A of holding guide 25. Drive shaft 12 remains above input shaft 21.

Figure 5:
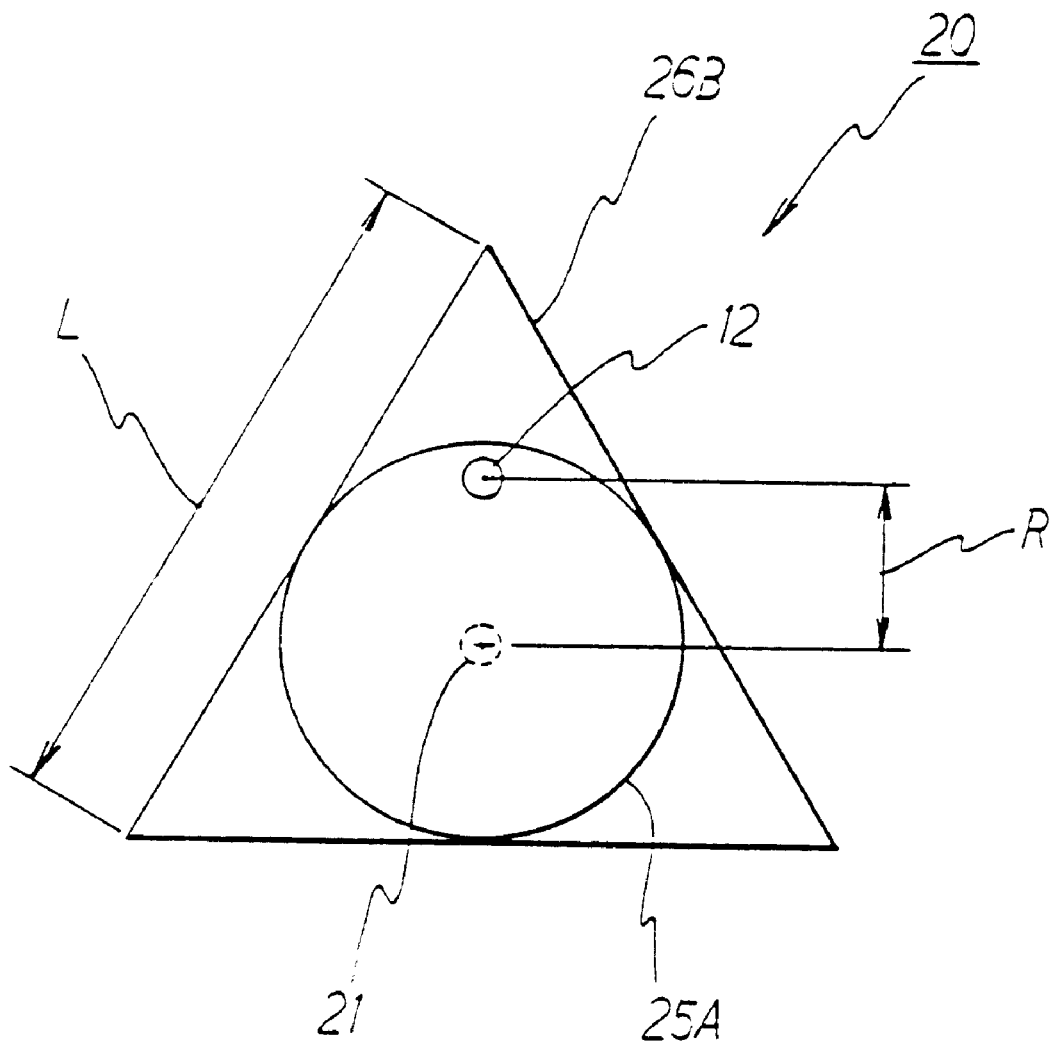
FIG. 5 is a schematically drawn explanatory drawing of the track drive mechanism which shows the distance relationship between the drive shaft and the input axis.
Figure 6:
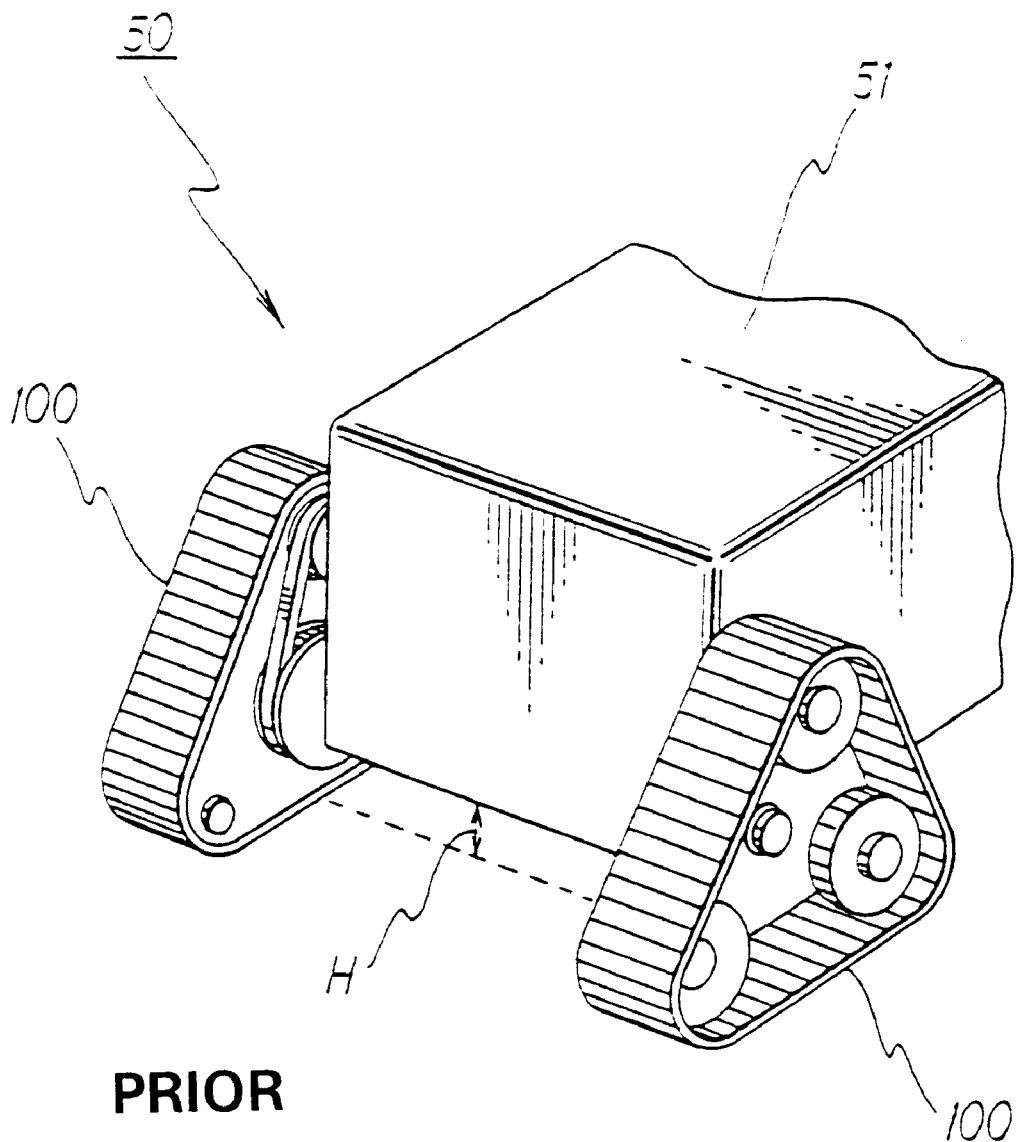
FIG. 6 is a perspective view showing the moving vehicle of the prior art with a portion removed.
Figure 9:
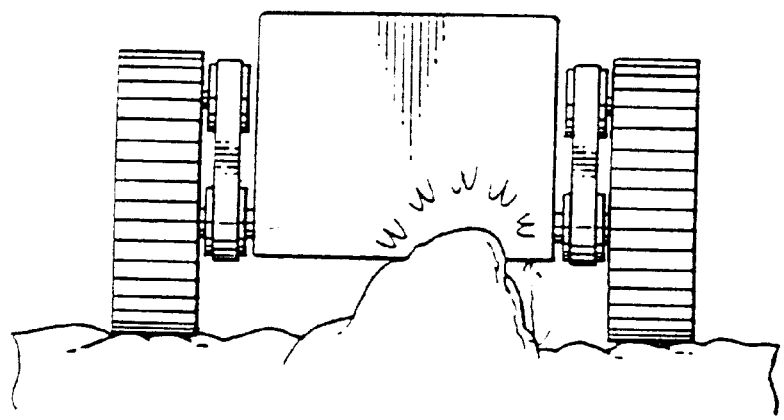
FIG. 9 is an explanatory drawing showing how the vehicle body of the moving vehicle can collide with an obstacle on the road.
Figure 10:
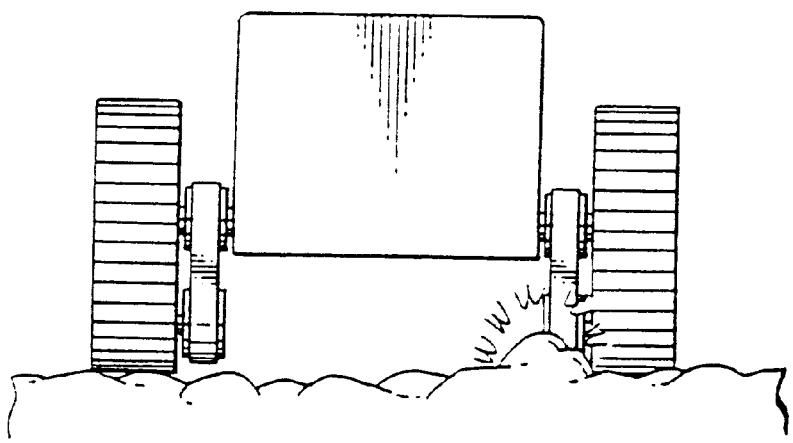
FIG. 10 is an explanatory drawing showing how the power transfer means of the track drive mechanism can collide with an obstacle on the road.

Referring to FIG. 5, a schematic view of track drive mechanism 20 shows the relationships between the length L of one side of equilateral triangle track drive mechanism 20 and the maximum difference of elevation R between drive shaft 12 and input axis 12. The maximum value for the difference in elevation R is equal to the radius of a circle inscribed in a equilateral triangle with a side of length L. This results in $R=(L/2)\cdot\tan(30°)$. The maximum elevation difference R becomes 0.2887 times length L. It is possible to place drive shaft 12 this distance higher than input axis 12. In practical terms, it is slightly smaller because of the limitation imposed by the radius of the axis of drive shaft 12.

Comparing FIG. 8, according to the prior art, the distance of the vehicle main body from the road surface is the same as the height H of the input axis. In the present embodiment, the distance of the vehicle body from the road surface is approximately twice as high as H. It is possible to elevate vehicle body 11 to approximately twice the height of the prior art drive system.

The movement of moving vehicle 10 that results from the above configuration will be summarized. Torque is provided to each drive shaft 12 by the drive means located inside vehicle body 11. Torque is transferred from each of the drive shafts 12 to each track drive mechanism 20.

When the road surface is relatively flat, torque is transferred from drive shaft 12 to input shaft 21 by way of second power transfer means 40. Furthermore, rotational movement is provided for wheel 23A. The drive of track 24 begins along the rotation direction of rotation wheels 23A, 23B, and 23B placed on support member 22. Moving vehicle 10 begins moving without any rotation of support member 22 and frame body 26 with respect to holding guide 25 (see FIG. 4(A)).

When travelling on jagged and extremely uneven roads, the driving of track 24 is hindered. In response, support member 22 begins rotating with respect to holding guide 25 with input shaft 21 about the center of rotation. Side plate 26B of frame body 26 rotates around the perimeter of holding guide 25 with circular plate 25A at the center. Simultaneously, track 20 as a whole rotates in concert. The vehicle travels with track drive mechanism 20 rotating as a whole, as a wheel. That is, support member itself is a wheel, although it is not perfectly round.

The present embodiment has drive shaft 12 placed above input shaft 21 by holding guide 25. Because torque is transferred from drive shaft 12 to input shaft 21 through second power transfer means 40, vehicle body 11 can be maintained at a higher position than was possible according to the prior art.

Damage to vehicle body 11 resulting from impact with obstacles on the surface over which the vehicle travels is prevented. The invention also provides maintenance advantages. It also becomes possible to travel on road surfaces with greater unevenness than was previously possible.

In the present invention, all of the structure of track drive mechanism 20, except for vehicle body anchoring end 25B of holding guide 25, is placed between side plates 26A and 26B of frame body 26. The entire frame body 26 is placed within the interior confines of the cross-direction of track 24. As a result, when moving, the front surface of track drive mechanism 20 is entirely hidden by track 24. Any damage due to collision of a structure, other than track 24, with an obstacle on the road surface is prevented.

In addition to the above advantages, the entering of sand and the like into the interior of track 24 is blocked by side plates 26A and 26B of frame body 26. Damage and breakdown of each portion is better prevented, and the maintenance is further improved.

In the present embodiment, support member 22 is placed along input shaft 21 between first power transfer means 30 and second power transfer means 40. As a result, each of the rotating wheels 23A, 23B, and 23B, held by support member 22, abuts the middle of the width of track 24. As a result, track 24 holds rotating wheels 23A, 23B, and 23B in better balance, and the transfer of driving force is better balanced as well. The stability during movement is increased.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

The track 24 of the present embodiment can be constructed from raw material with an increased hardness. For example, small pieces of metal can be linked together over a belt.

The number of rotating wheels is not limited to three as indicated in the present embodiment. For example, a track drive mechanism can be constructed with four or more wheels.

The moving vehicle described above has the same advantages as the moving vehicle of the prior art. In addition, the drive shaft is placed above the input axis by the holding guide. Because torque is transferred from the drive shaft to the input axis through the second power transfer means, the vehicle body can be supported at a higher position than was previously possible.

As a result, damage to the vehicle body due to collisions with obstacles on the road is prevented. The maintenance of the entire moving vehicle is improved. At the same time, it becomes possible to travel on roads that have greater unevenness.

According to an embodiment of the invention, all of the structure of the track drive mechanism except for the vehicle body anchoring end of the holding guide is placed within the interior of the track mechanism. As a result, when moving, the front surface of the track drive mechanism is completely hidden by the track. Any collision between a structure other than the track and an obstacle on the road is prevented. For instance, damage to the power transfer means which jutted out in the prior art is successfully prevented. The overall maintenance of the moving vehicle is improved.

According to an embodiment of the invention, the support member is placed along the input axis between the first and second power transfer means. As a result, each of the rotating wheels held by the support member abut the middle of the width of the track. As a result, the track can hold the rotating wheels in better balance, and the transfer of driving force is better balanced as well. The stability during movement increases.

What is claimed is:

1. A vehicle, comprising:
   a main vehicle body;
   a plurality of track drives, each having a track arranged to allow said vehicle body to be supported, above a surface, by said tracks;

each of said tracks being revolvable about said each of said plurality of track drives, and each of said plurality of track drives being rotatable about a respective center of rotation, whereby said vehicle body can move about on said surface either by movement of said tracks or by rotation of said track drives;

a motor drive drivingly connected to power rotation of at least one of said track drives;

an input shaft driven by a drive shaft of said motor drive;

a first power transfer drive which transfers the rotations from said input shaft to at least one of said rotating wheels;

a second power transfer drive which transfers torque in each of said track drives from said drive shaft to said input shaft;

a holding guide anchored at one end to said vehicle body and at the other end to said track drive; and said input shaft being supported by said holding guide between said drive shaft and said surface.

2. A vehicle as in claim 1, wherein:

each of said tracks defines a respective volume bounded by said track;

said first power transfer drive lies substantially within said volume to the extent that said track protects said first power transfer drive from objects on said surface.

3. A vehicle as in claim 1, wherein:

each of said tracks defines a respective volume bounded by said track;

said first power transfer drive lies substantially within said volume to the extent that said track protects said first power transfer drive from objects on said surface;

each of said tracks has two opposite openings by virtue of said each of said tracks forming a loop; and each of said track drives has an enclosure defined by said track and at least one protection element substantially enclosing at least one said openings.

4. A vehicle as in claim 3, wherein said at least one protection element includes a disk-shaped element connecting said holding guide to a bearing supporting said input shaft.

5. A track drive for attachment to a vehicle, comprising:

three rotating wheels;

a support member supporting said three rotating wheels with rotational axes at vertices of an equilateral triangle;

a continuous track reeved over said three rotating wheels;

a holding member rigidly affixed to said vehicle;

a drive shaft having a drive axis passing through said holding member;

a support axis of said support member being offset from said drive axis, whereby a body of said vehicle is at least one of raised and lowered with respect to a supporting surface;

an input shaft at said support axis;

first means for coupling drive power from said drive shaft to said input shaft;

second means for coupling said drive power from said input shaft to at least one of said rotating wheels, whereby said track is driven; and means for permitting said support member and said three rotating wheels to rotate about said support axis, whereby a surface of said track is enabled to adapt to said supporting surface.

* * * * *